United States Patent [19]
Sakai

[11] Patent Number: 4,979,027
[45] Date of Patent: Dec. 18, 1990

[54] IMAGE READING APPARATUS HAVING AMPLIFICATION FACTORS VARY IN RESPONSE TO A SPATIAL FREQUENCY OF AN INPUT IMAGE SIGNAL

[75] Inventor: Masanori Sakai, Yokohama, Japan

[73] Assignee: Canon Kabushiki Kaisha, Tokyo, Japan

[21] Appl. No.: 216,500

[22] Filed: Jul. 8, 1988

[30] Foreign Application Priority Data

Jul. 15, 1987 [JP]  Japan .................................. 62-177604
Jul. 15, 1987 [JP]  Japan .................................. 62-177605

[51] Int. Cl.$^5$ .............................................. H04N 1/46
[52] U.S. Cl. ........................................ 358/75; 358/80; 358/464
[58] Field of Search ................... 358/75, 80, 280, 282, 358/284, 44

[56] References Cited

U.S. PATENT DOCUMENTS

| | | | |
|---|---|---|---|
| 4,369,471 | 1/1983 | Hirata | 358/282 |
| 4,496,967 | 1/1985 | Sase et al. | 358/44 |
| 4,647,961 | 3/1987 | Kammoto et al. | 358/75 |
| 4,734,762 | 3/1988 | Aoki et al. | 358/75 |
| 4,736,251 | 4/1988 | Sasaoka | 358/293 |
| 4,751,567 | 6/1988 | Hashimoto | 358/44 |
| 4,839,739 | 6/1989 | Tachiuchi et al. | 358/482 |
| 4,862,286 | 8/1989 | Suda et al. | . |
| 4,891,690 | 1/1990 | Hasegawa et al. | 358/75 |

Primary Examiner—James J. Groody
Assistant Examiner—Kim Yen Vu
Attorney, Agent, or Firm—Fitzpatrick, Cella, Harper & Scinto

[57] ABSTRACT

An image reading apparatus has an image scanner for photoelectrically reading an original image and outputting an image signal representing the original image and an amplifier for amplifying the image signal output from the image scanner. The image scanner reads the original image in units of lines and outputs a serial output signal. The amplification factor of the amplifier is changed in accordance with a frequency of the input image signal.

16 Claims, 12 Drawing Sheets

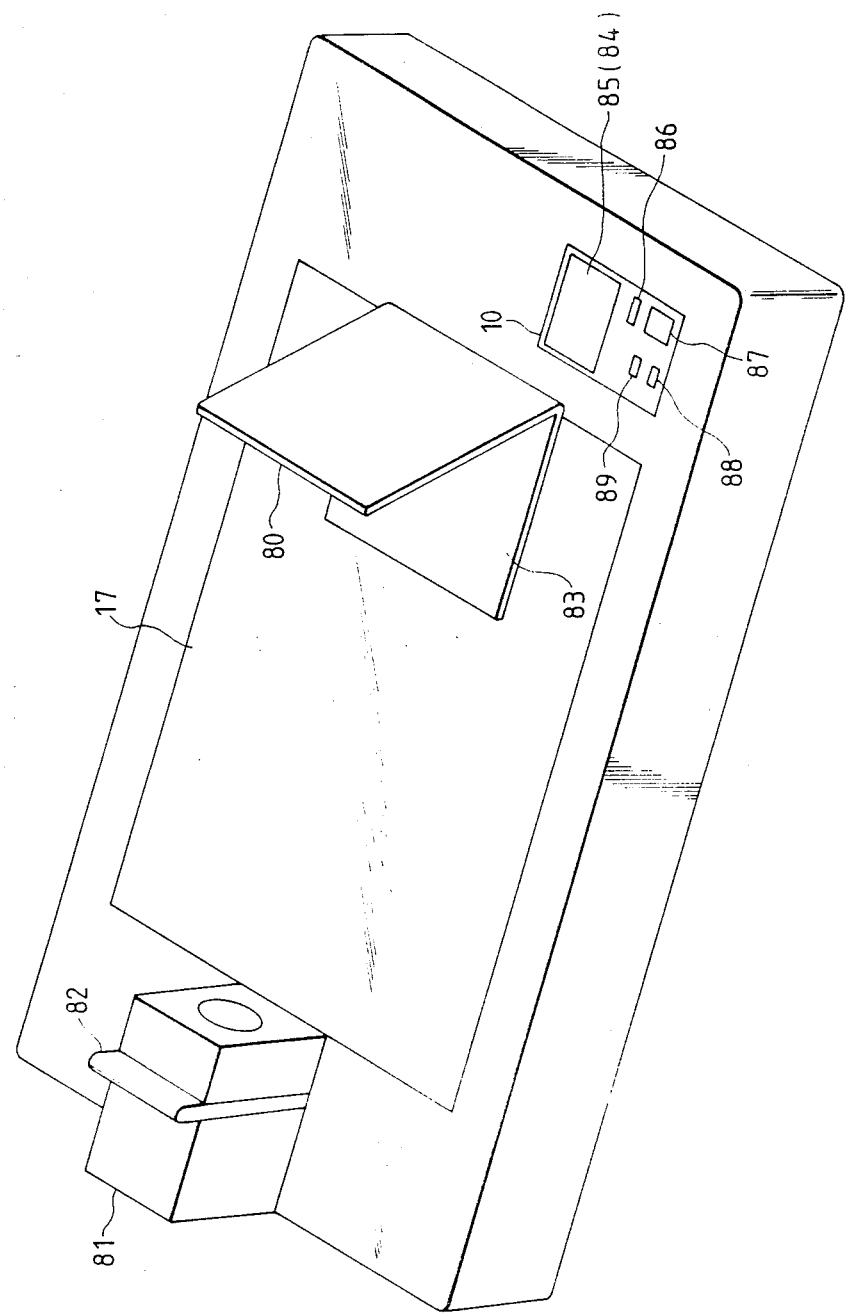

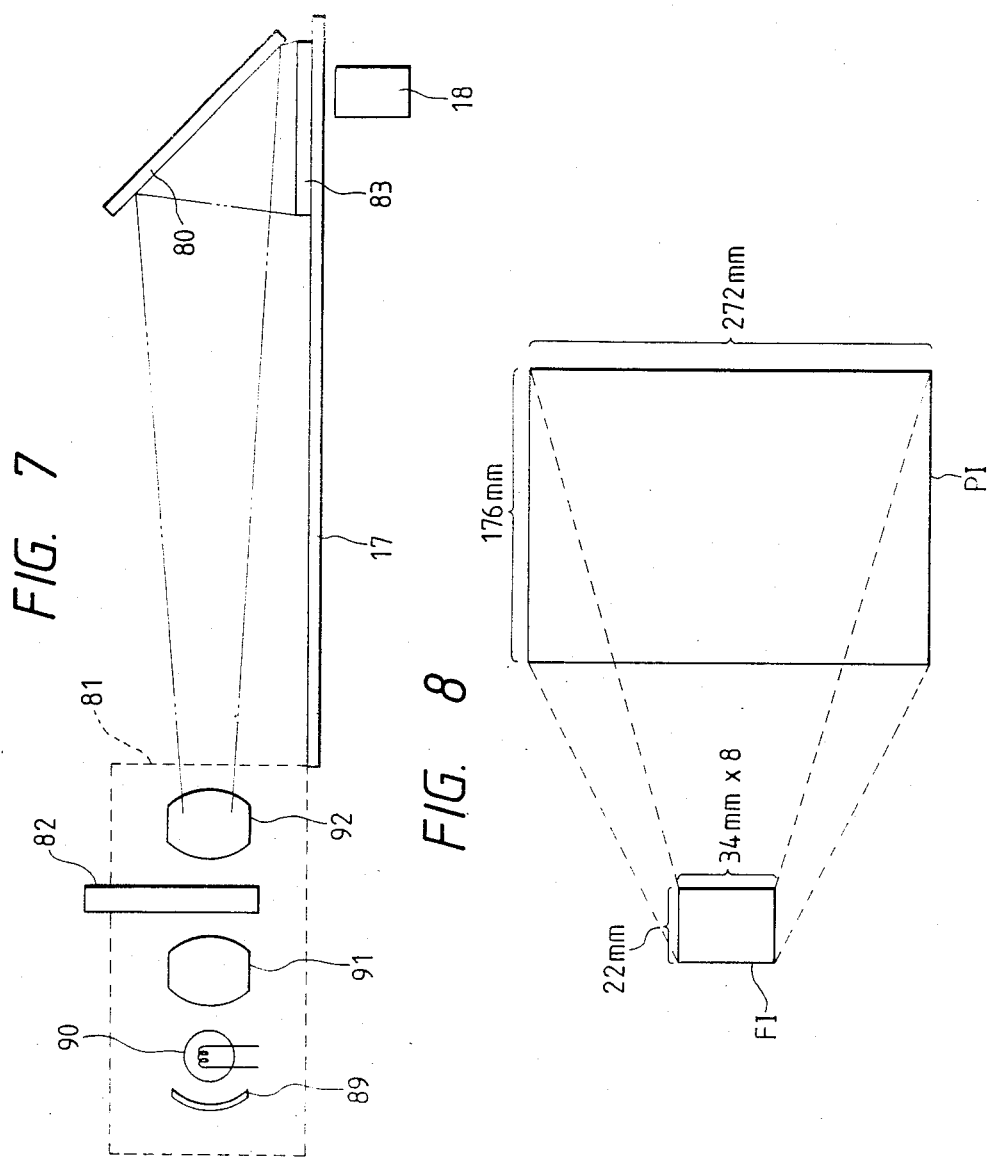

FROM D/A CONVERTER 100Z

IMAGE READING APPARATUS HAVING AMPLIFICATION FACTORS VARY IN RESPONSE TO A SPATIAL FREQUENCY OF AN INPUT IMAGE SIGNAL

BACKGROUND OF THE INVENTION

1. Field of the Invention

The present invention relates to an image reading apparatus used in an apparatus for electrically processing an image.

2. Related Background Art

In order to electrically process an image, an image reading apparatus is used to photoelectrically read an original image by using an image sensor such as a CCD sensor and forming an image signal representing an original image.

In such an image reading apparatus, an MTF (Modulation Transfer Function) as one of the factors for accurately reading an original image must be improved.

An improvement in the MTF in a conventional image reading apparatus is achieved by arranging an optical lens for reading an image to close to an ideal lens or by decreasing an opening of the image sensor.

Even in an ideal lens, a decrease in MTF is theoretically present. It is difficult to accurately read a thin line having a high spatial frequency. A decrease in opening size of the image sensor is equal to a decrease in area of a light-receiving element used for photoelectric conversion in the image sensor. As a result, the photoelectrically converted electrical signal has a small magnitude, and electrical processing of this signal is very difficult.

Another conventional image reading apparatus is a color image reading apparatus for causing an optical filter to perform color separation of red (R), green (G), and blue (B) of a color original image, and photoelectrically converting the resultant color images into electrical signals. However, MTFs for the R, G, and B may often be different from each other. When MTFs are different and a color image is reproduced using the read electrical signals, color unbalance occurs, and accurate color image reproduction cannot often be performed.

SUMMARY OF THE INVENTION

The present invention has been made in consideration of the above situation, and has as its object to provide a high-quality image reading apparatus for electrically correcting degradation of an optical MTF.

It is another object of the present invention to provide an image reading apparatus capable of performing excellent image reading regardless of the spatial frequencies of images.

It is still another object of the present invention to provide an image reading apparatus capable of performing excellent image reading of color images.

The above and other objects, features, and advantages of the present invention will be apparent from the following detailed description in conjunction with the accompanying drawings.

BRIEF DESCRIPTION OF THE DRAWINGS

FIG. 6 is a perspective view of the scanner section 1 mounted with a projector unit 81 and a reflecting mirror 80, both of which constitute a projecting/exposing means;

FIG. 7 is a view showing a detailed arrangement of a film projection system;

FIG. 8 is a view showing a relationship between a film and an image projected and formed on an original glass table;

DETAILED DESCRIPTION OF THE PREFERRED EMBODIMENT

The present invention will be described in detail with reference to a preferred embodiment.

(Description of Outer Appearance)

Figure 1:
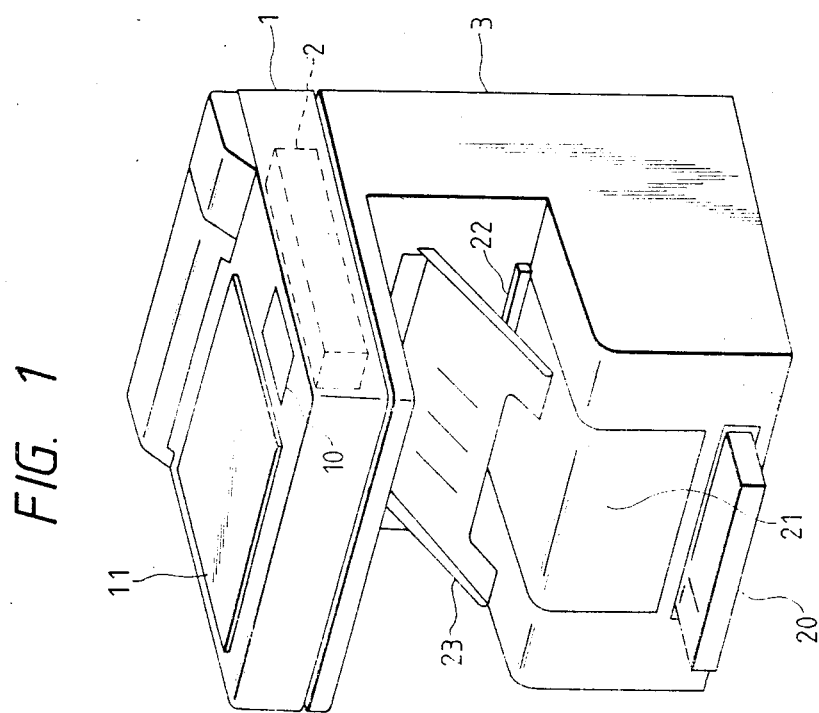
FIG. 1 is a perspective view showing a digital color copying machine according to an embodiment of the present invention.

FIG. 1 shows an outer appearance of a digital color copying machine according to an embodiment of the present invention.

The digital color copying machine can be divided into two parts.

The upper part in FIG. 1 comprises a color image scanner section 1 (to be referred to as a scanner section 1 hereinafter), and a control section 2, incorporated in the scanner section 1, for performing various image processing operations of the digital color image data. The control section 2 has processing functions such as an interface function with external devices.

The scanner section 1 reads an image of a stereotyped object or a sheet original placed under an original holder 11 facing down. The scanner section 1 also has a function for reading a large sheet original.

An operation unit 10 is connected to the control section 2 and is used to allow an operator to input various information necessary for desired image processing. The control section 2 outputs an instruction associated with operations of the scanner unit 1 and a printer section 3. When complex editing is required, a data input unit such as a digitizer is mounted in place of the original holder 11 and is connected to the control section 2. Additional information can be input from this data input unit, thereby allowing advanced processing.

The lower part in FIG. 1 comprises the printer section 3 for recording a color image on a recording sheet fed from a manual insertion port 22 or a paper feed cassette 20 on the basis of a color digital image signal output from the control section 2. The printer section 3 is a full-color ink jet printer using bubble jet type recording heads. The recording sheet with the image thereon is discharged onto a discharge tray 23.

The scanner section 1 and the printer section 3 can be divided into two parts, and the divided parts can be placed in separate positions through a connection cable.

(Printer Section)

Figure 2:
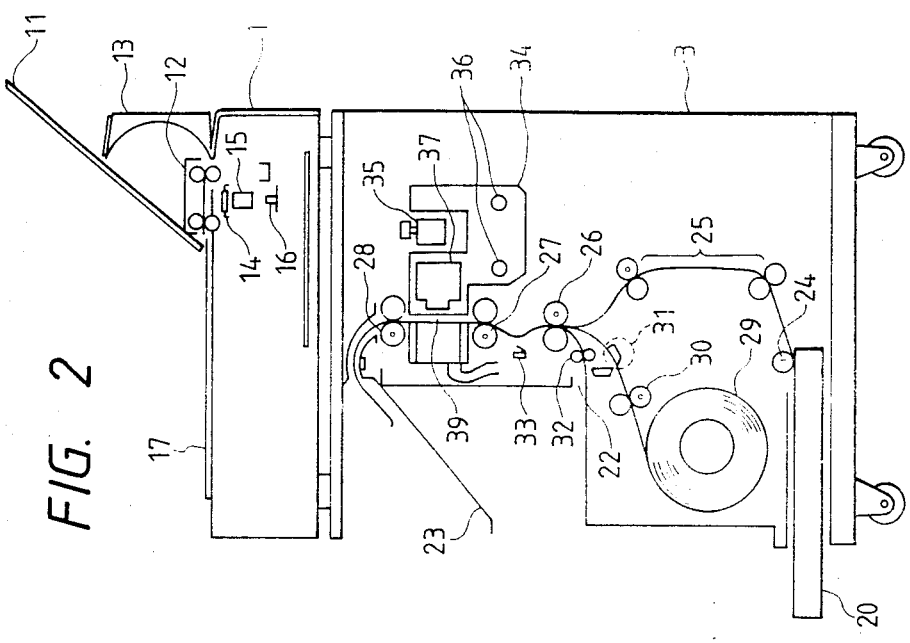
FIG. 2 is a side view showing an internal arrangement of the digital color copying machine in FIG. 1.

FIG. 2 shows an internal structure of the digital color copying machine in FIG. 1.

An original image of an original placed on an original glass table 17 and exposed by an exposure lamp 14, an image projected on the original glass table 17 by a projector, or a sheet original image conveyed by a sheet feed mechanism 12 and exposed by the exposure lamp 14 is photoelectrically read by a lens 15 and a full-color line image sensor 16 (CCD sensor in this embodiment). Image data from the image sensor 16 is processed by the scanner section 1 and the control section 2. A color image is recorded on the recording sheet by the printer section 3 in accordance with the processed image data.

Referring to FIG. 2, the recording paper is fed from the paper feed cassette 20 for storing cut sheets of small and regular sizes (A4 to A3 sizes in this embodiment) or a roll of paper 29 for recording an image having a large size (A2 to A1 sizes in this embodiment).

Recording sheets may be fed one by one from the manual insertion port 22 in FIG. 22, so that any sheet outside the copying machine can be used.

A pickup roller 24 is used to feed the cut sheets from the paper feed cassette 20 one by one. The fed cut sheet is conveyed to first paper feed rollers 26 by cut sheet feed rollers 25.

The roll of paper 29 is fed by rolled paper feed rollers 30 and is cut into a standard size by a cutter 31. The cut sheet is fed to the first paper feed rollers 26.

Similarly, a recording sheet inserted from the manual feed port 22 is fed by manual insertion rollers 32 to the first paper feed rollers 26.

The pickup roller 24, the cut sheet feed rollers 25, the rolled paper feed rollers 30, the first paper feed rollers 26, the manual insertion rollers 32 are driven by a paper feed motor (not shown) (a DC servo motor is used in this embodiment). The ON/OFF operations of the rollers are controlled by electromagnetic clutches attached thereto, respectively.

When printing is started in accordance with an instruction from the control section 2, the recording sheet selectively fed from one of the above-mentioned paper feed paths is fed to the first paper feed rollers 26. In order to eliminate ramp of the recording paper, a predetermined loop of the recording sheet is formed at the first paper feed rollers 26, and then the first paper feed rollers 26 are turned on. Therefore, the recording sheet is conveyed to second paper feed rollers 27.

In order to assure accurate paper feeding between paper feed rollers 28 and the second paper feed rollers 27, the recording sheet is waved by a predetermined amount to form a buffer in the path between the first paper feed rollers 26 and the second paper feed rollers 27. A buffer amount detection sensor 33 is a sensor for detecting a buffer amount. By always forming a buffer during conveyance, a load acting on the paper feed rollers 28 and the second paper feed rollers 27 can be reduced when a recording sheet having a large size is to be fed, thereby achieving accurate paper feeding.

In order to perform printing with recording heads 37, a scanning carriage 34 for holding the recording heads 37 and the like is moved to be reciprocal along carriage rails 36 by a scanning motor 35. In the forward scanning cycle, an image is printed on the recording sheet held by a platen 39. In the reverse scanning cycle, printing is not performed but the recording sheet is fed by the paper feed rollers 28 by a predetermined amount. At this time, the conveying system including the first paper feed rollers 26 is controlled to be driven such that the buffer amount of the recording sheet is kept to be a predetermined buffer by the buffer amount detection sensor 33.

The printed recording sheet is discharged onto the discharge tray 23, and therefore printing is completed.

A structure around the scanning carriage 34 will be described in detail with reference to FIG. 3.

Figure 3:
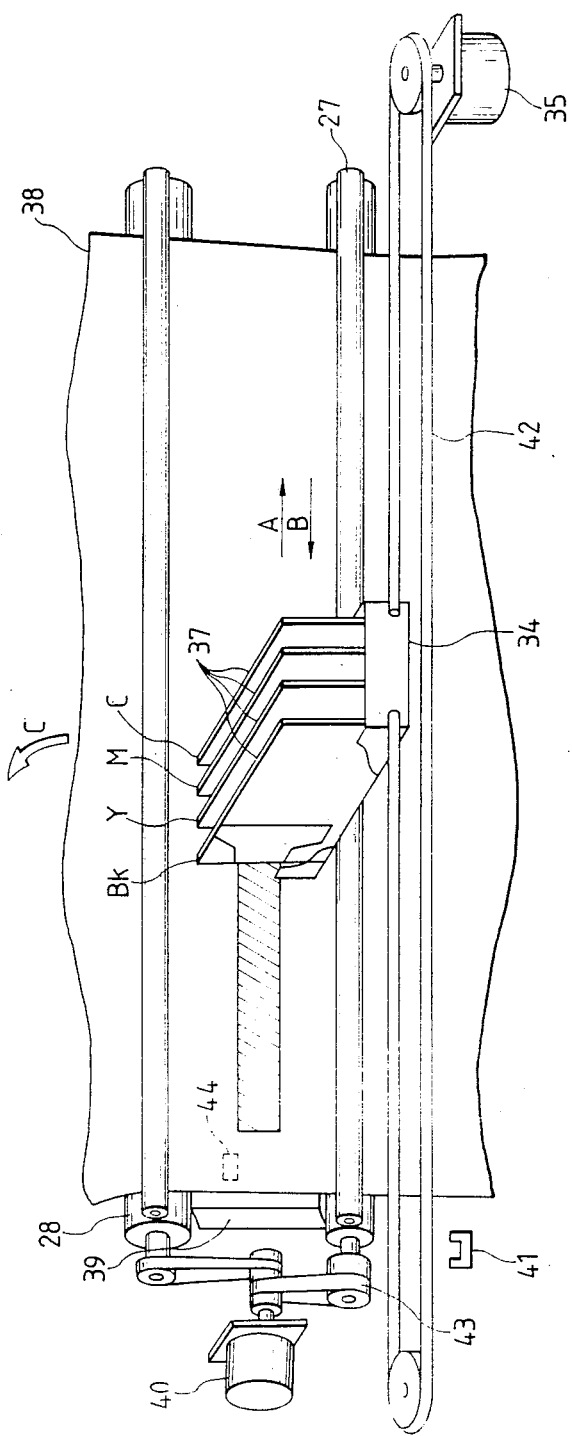
FIG. 3 is a perspective view showing an arrangement around a scanning carriage 34.

Referring to FIG. 3, a paper feed motor 40 serves as a driving source for intermittently feeding the recording sheet and drives the paper feed rollers 28 and the second paper feed rollers 27 through a clutch 43 for the second paper feed rollers.

The scanning motor 35 serves as a driving source for driving the scanning carriage 34 through a scanning belt 42 in a direction indicated by an arrow A or B. Since accurate paper feed control and accurate control of the recording heads 37 are required in this embodiment, the paper feed motor 40 and the scanning motor 35 comprise pulse motors, respectively.

When the recording sheet reaches the second paper feed rollers 27, the clutch 43 and the paper feed motor 40 are turned on to feed the recording sheet to the paper feed rollers 28 along the platen 39.

The recording sheet is detected by a paper detection sensor 44 arranged on the platen 39, and the sensor information is utilized for position control, jamming control, and the like.

When the recording sheet reaches the paper feed rollers 28, the clutch 43 and the paper feed motor 40 are turned off. The recorded sheet is chucked by a suction motor (not shown) from the inside of the platen 39, so that the recording sheet is brought into tight contact with the platen 39.

Prior to an operation for recording an image on the recording sheet, the scanning carriage 34 is moved to the home position corresponding to a home position sensor 41. The scanning carriage 34 is then moved in the forward direction indicated by arrow A. Cyan, magenta, yellow, and black inks are injected from the predetermined positions of the recording heads 37 onto the recording sheet. When image recording for a predetermined period of time is completed, the scanning carriage 34 is stopped. The scanning carriage 34 is then driven in the reverse direction indicated by arrow B to the home position corresponding to the home position sensor 41. During reverse driving, the recording sheet is fed by a width corresponding to an image recorded with the recording heads. This operation is performed by the paper feed rollers 28 driven by the paper feed motor 40 in a direction indicated by arrow C.

The number of the recording heads 37 is four and each head has an array of 256 bubble jet type ink jet nozzles in a direction substantially perpendicular to the moving direction of the scanning carriage 34.

When the scanning carriage 34 is stopped at the home position detected by the home position sensor 41, the recovery operation of the recording heads 37 is started to perform stable recording. In order to prevent different ink jet timings caused by changes in viscosities of the inks left in the nozzles of the recording heads 37, the recording heads 37 are compressed and ink jet idling are performed in accordance with programmed conditions given in consideration of paper feed times, internal temperatures of the machine, and the ink jet times.

(Scanner Section)

The above operation is repeated to perform image recording on the entire surface of the recording sheet.

An operation of the scanner section 1 will be described with reference to FIGS. 4 and 5.

Figure 4:
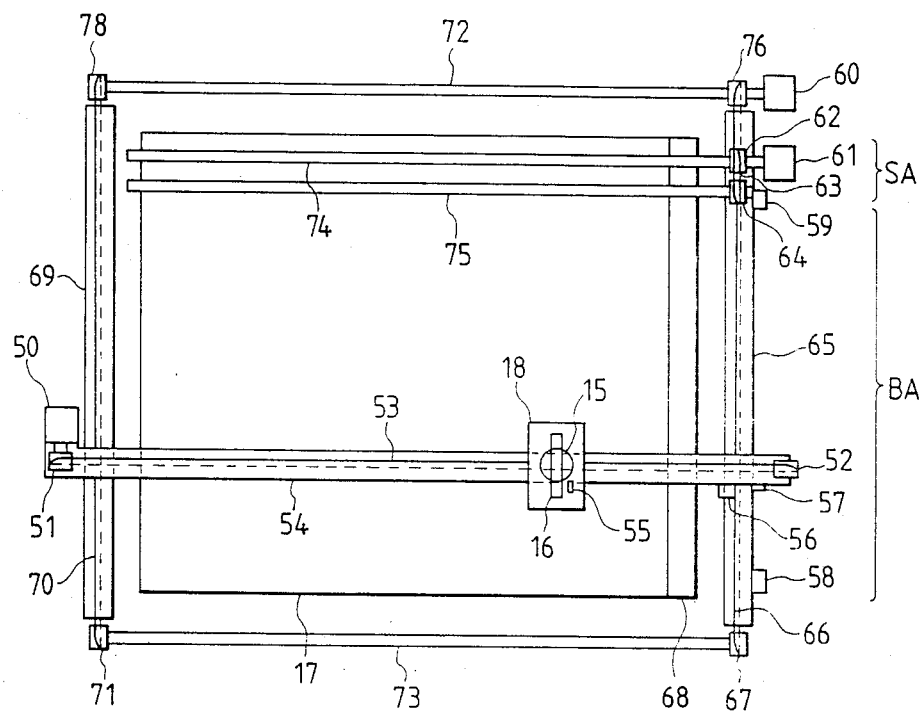
FIG. 4 is a view showing an internal mechanism in a scanner section 1.

FIG. 4 is a view for explaining an internal mechanism of the scanner section 1.

A CCD unit 18 includes a CCD 16 having several hundreds of light-receiving elements arranged in a line and red (R), green (G), and blue (B) color separation filters arranged on the light-receiving elements in a predetermined cycle, and the lens 15 for focusing an optical image on the CCD 16. The CCD unit 18 is moved along a rail 54 by a unit comprised of a main scanning motor 50, a pulley 51, a pulley 52, and a wire 53, all of which are fixed on the rail 54. The CCD unit 18 reads an image on the original glass table 17 in the main scanning direction. A light-shielding plate 55, a home position sensor 56, and the like are used for position control when the CCD unit 18 is moved to the main scanning home position in a correction area 68.

The rail 54 is placed on a pair of rails 65 and 69 and is driven by a driving system comprised of a subscanning motor 60, pulleys 67, 78, 71, and 76, shafts 72 and 73, and wires 66 and 70 in the subscanning direction. A light-shielding plate 57 and home position sensors 58 and 59 are used for position control for moving the rail 54 to the subscanning home position in a book mode for reading an original such as a book placed on the original glass table 17 or in a sheet mode for reading a sheet image.

A sheet feed motor 61, sheet feed rollers 74 and 75, pulleys 62 and 64, and the wire 63 constitute a mechanism for feeding the sheet original. This mechanism is used such that a sheet original placed facing down is fed by the sheet feed rollers 74 and 75 by a predetermined amount.

Figure 5:
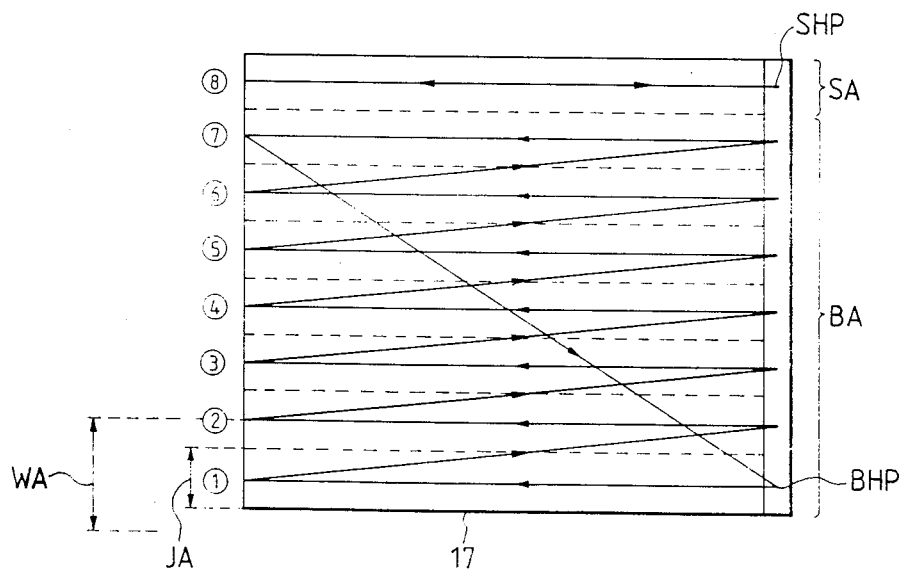
FIG. 5 is a view showing read operations in the book and sheet modes.

FIG. 5 is a view for explaining reading in the book and sheet modes.

In the book mode, the CCD unit 18 is moved to the book mode home position (BHP) located in the correction area 68 in FIG. 5, and an image on the entire surface of the original placed on the original glass table 17 is read.

Prior to original scanning, shading correction, black level correction, and color correction are performed in the correction area 68. Thereafter, scanning in the main scanning direction indicated by an arrow is started by the main scanning motor 50. When reading of an area ① is completed, the main scanning motor 50 is rotated in the reverse direction and at the same time the subscanning motor 60 is driven. The CCD unit 18 is then moved to an area ② in the correction area 68. Subsequently, in the same manner as in main scanning of the area ①, shading correction, black level correction, color correction, and the like are performed as needed, and an image in the area ② is read.

By repeating the above scanning cycle, all images in areas ① to ⑦ are sequentially read. When the image of the area ⑦ is read, the CCD unit 18 returns to the book mode home position BHP again.

Since the original glass table 17 allows reading of an original having a maximum size of A2, a larger number of scanning cycles must be repeated in practice. However, for the sake of simplicity, the operation is simplified in this embodiment.

In the sheet mode, the CCD unit 18 is moved to a sheet mode home position (SHP) and is moved to be reciprocal in an area ⑧ a plurality of times while the sheet feed motor 61 is intermittently driven to intermittently feed the sheet original, thereby reading images of the respective areas and hence the image of the entire surface of the sheet original.

In the sheet mode, shading correction, black level correction, and color correction are performed prior to scanning of the original in the same manner as in the book mode. Thereafter, scanning in the main scanning direction indicated by an arrow is started by the main scanning motor 50. When reading in the forward direction of the area ⑧ is completed, the main scanning motor 50 is rotated in the reverse direction. During scanning in the reverse direction, the sheet feed motor 61 is driven to move the sheet original by a predetermined amount in the subscanning direction. Subsequently, the operation described above is repeated, and the image on the entire surface of the sheet original is read.

When the above operation is performed with a one-to-one magnification, an area WA read by the CCD unit 18 is larger than an effective area JA read in practice in one-to-one reading because the digital color copying machine of this embodiment has a variable magnification function such as enlargement and reduction functions. The area recorded with the recording heads 37 is fixed as 256 bits/cycle. When 50% reduction copying is performed, image information of an area of the number of bits twice 512 bits is required. Therefore, the scanner section 1 has a function for reading and outputting image information of any image area in one main scanning cycle.

(Film Projection System)

A projecting/exposing means for film projection can be attached to the scanner section 1 of this embodiment.

FIG. 6 is a perspective view of an arrangement wherein a projector unit 81 and a reflecting mirror 80 which serve as the projecting/exposing means are attached to the scanner section 1.

The projector unit 81 is a projector for projecting an image of a negative or positive film. The film is held in a film holder 82 and is loaded in the projector unit 81.

An image projected from the projector unit 81 is reflected by the reflecting mirror 80 and reaches a Fresnel lens 83. The Fresnel lens 83 collimates the image light and focuses the collimated light on the original glass table 17.

The negative or positive film image is formed on the original glass table 17 through the projector unit 81, the reflecting mirror 80, and the Fresnel lens 83. The image is read by the CCD unit 18 in the same manner as in reflective image reading in the book mode.

FIG. 7 is a view for explaining a detailed arrangement of the film projection system.

The projector unit 81 comprises a halogen lamp 90, a reflecting plate 89, a focusing lens 91, the film holder 82, and a projection lens 92. Light directly emitted from the halogen lamp 90 and light reflected by the reflecting plate 89 are focused by the focusing lens 91, and focused light reaches a window of the film holder 82. The film holder 82 has a window slightly larger than the size of one frame of the negative or positive film, so that the film can be stored therein with a sufficient margin.

When projection light reaching the window of the film holder 82 passes through the film loaded in the film holder 82, a projected image of the film can be obtained. The projected image is optically enlarged by the projection lens 92, and the direction of the enlarged image is changed by the reflecting mirror 80. Therefore, the resultant image is converted by the Fresnel lens 83 into an image of collimated light.

This image is read by the CCD unit 18 in the scanner unit 1 in the same manner as in the book mode. The read image is converted into a video signal.

FIG. 8 is a view showing a relationship between the film and an image projected on the original glass table.

A film image FI having a size of 22×34 mm is enlarged with ×8 to obtain a projected image PI formed on the original glass table 17.

(Description of Function Blocks)

The function blocks of the digital color copying machine according to this embodiment will be described with reference to FIG. 9.

Controls 102, 111, and 121 are control circuits for controlling the scanner section 1, the control section 2, and the printer section 3, respectively. The controls 102, 111, and 121 are constituted by a microcomputer, a program ROM, a data memory, and an I/O interface, and the like. The controls 101 and 111 and controls 111 and 121 are connected through communication lines. The controls 101 and 121 are operated in accordance with a command from the control 111, thus constituting a master-slave control system.

The control 111 is operated in accordance with an input command from the operation unit 10 and a digitizer 114 when the apparatus of this embodiment serves as a color copying machine.

The operation unit 10 comprises a liquid crystal display (LCD display unit 84) as a display unit and a touch panel 85 comprised of transparent electrodes formed on the surface of the display unit. The operation unit 10 is used to select and designate information associated with color reproduction and editing. The operation unit 10 includes independent frequently used operation keys such as a start key 87 for designating the start of copying operation, a stop key 88 for designating the stop of copying operation, a reset key 89 for restoring the copying machine in the normal operation mode, and a projector key 86 for selecting the projector.

The digitizer 114 is used to input position information necessary for trimming and masking. The digitizer 114 serves as an optional component used for complex editing.

The control 111 controls an I/F control 112 which is a control circuit of versatile parallel interface such as an IEEE-488 or a so-called GP-IB interface. I/O control of the image data with external devices and remote control by external devices can be performed through this parallel interface.

The control 111 also controls a multilevel composition unit 106, an image processing unit 107, a binary encoding processing unit 108, a binary composition unit 109, and a buffer memory 110.

The control 102 controls of a driving unit 105 for mechanism, which controls driving of the mechanism of the scanner section 1, an exposure control 103 for performing exposure control of the lamp 14 during original image reading, and an exposure control 104 for performing exposure control of the halogen lamp 90 when the projector is used. The control 102 also controls an analog signal processing unit 100 and an input image processing unit 101 for performing various operations associated with images.

The control 121 controls a driving unit 122 for mechanism which controls driving the mechanism of the printer section 3, and a synchronization delay memory 115 for absorbing variations in operating times of the mechanism of the printer section 3, and correcting the delay due to different positions of arrayed recording heads 117 to 120.

The operations of the image processing blocks in FIG. 9 will be described in accordance with a flow of an image.

An image formed on the CCD 16 is converted into an analog electrical signal by the CCD 16. The converted image information is serially processed in an order of red, green, and blue. The serial output signal is input to the analog signal processing unit 100.

The analog signal processing unit 100 performs sampling/holding of red, green, and blue components of the input analog signal, corrects the dark level of the input analog signal, and controls the dynamic range of the input analog signal. The analog signal processing unit 100 performs analog-to-digital conversion (A/D conversion) to produce a multilevel (8-bit length in each color in this embodiment) digital image signal. This image signal is input to the input image processing unit 101.

Figure 11:
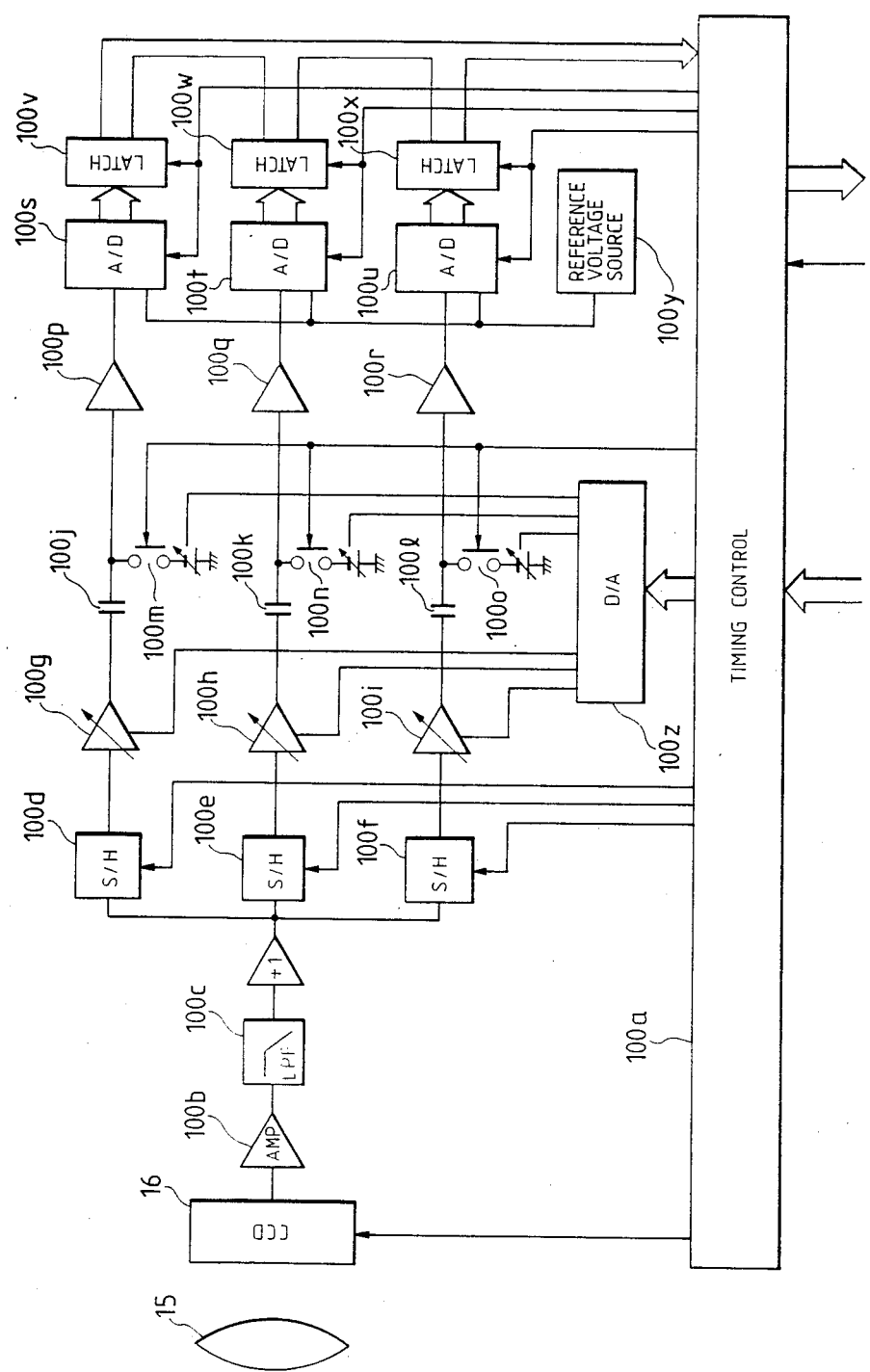
FIG. 11 is a block diagram showing one arrangement of an analog signal processing unit.

FIG. 11 is a block diagram showing a detailed arrangement of the analog signal processing unit 100.

An image having passed through the lens 15 is photoelectrically converted by the CCD 16. The image information is represented by a serial analog electrical signal in an order of red, green, and blue. The serial analog electrical signal is amplified by an amplifier 100b, and the amplified signal is input to a low-pass filter 100c to eliminate noise from the image signal. The resultant image signal is separated by S/H circuits 100d, 100e, and 100f into red, green, and blue image signals in response to a timing signal from a timing control 100a. Variable amplifiers 100g, 100h, and 100i are voltage-controlled amplifiers whose amplification factors are controlled in accordance with an output voltage from a D/A converter 100z. The red, green, and blue image signals are amplified by the variable amplifiers 100g, 100h, and 100i in accordance with an output voltage form the D/D converter 100z whose output is changed in accordance with a signal from the control 102.

Capacitors 100j, 100k, and 100l and switches 100m, 100n, and 100o perform dark clamping in response to a timing signal from the timing control 100a. The dark clamping level can be set in accordance with the signal from the control 102 through the D/A converter 100z in the same manner as described above.

Figure 12:
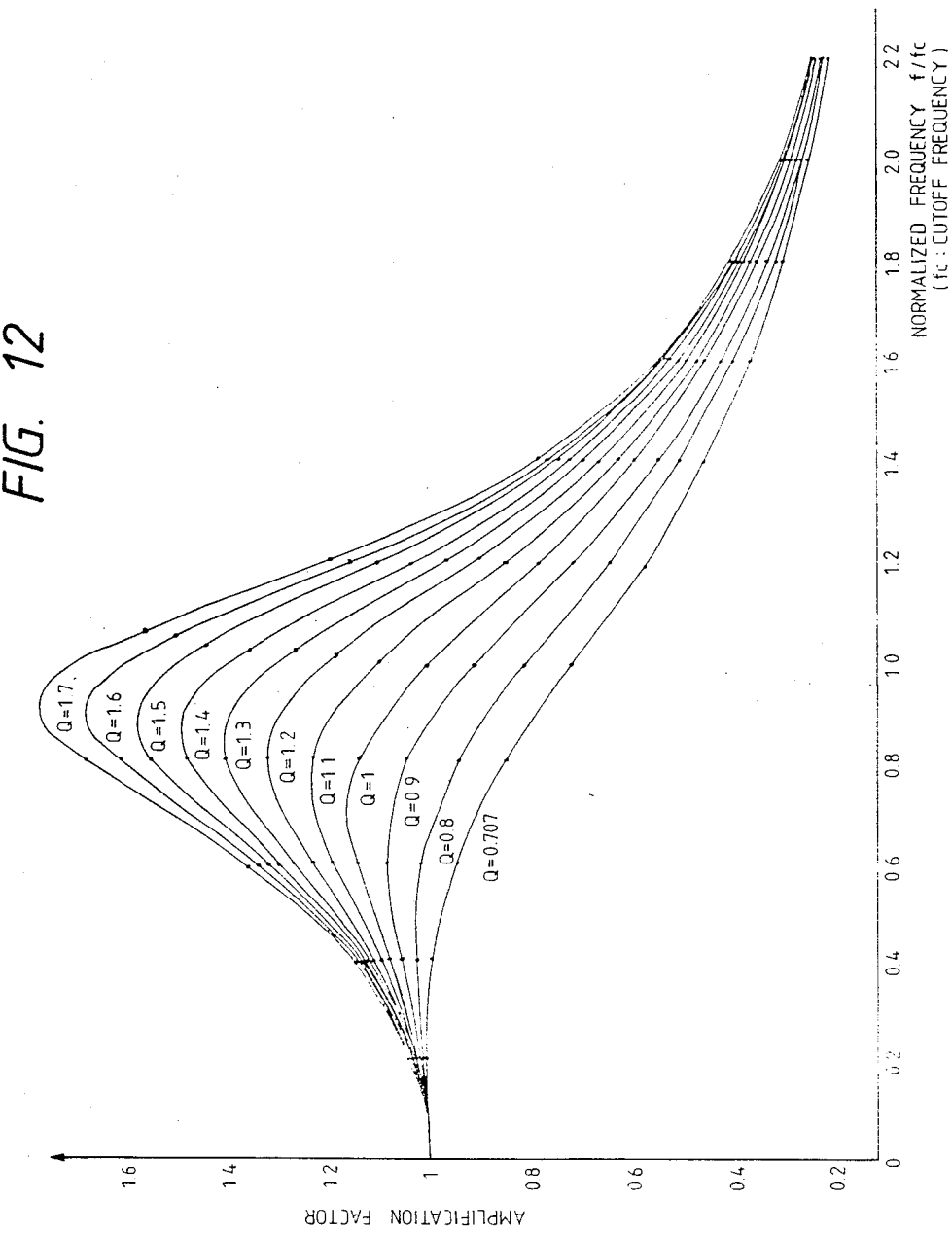
FIG. 12 is a graph showing a relationship between the frequency and the amplification factor.
Figure 13:
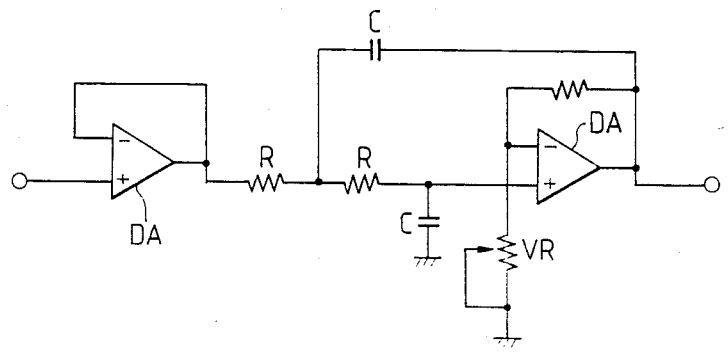
FIG. 13 is a block diagram of an amplifier having a variable frequency characteristic.
Figure 14:
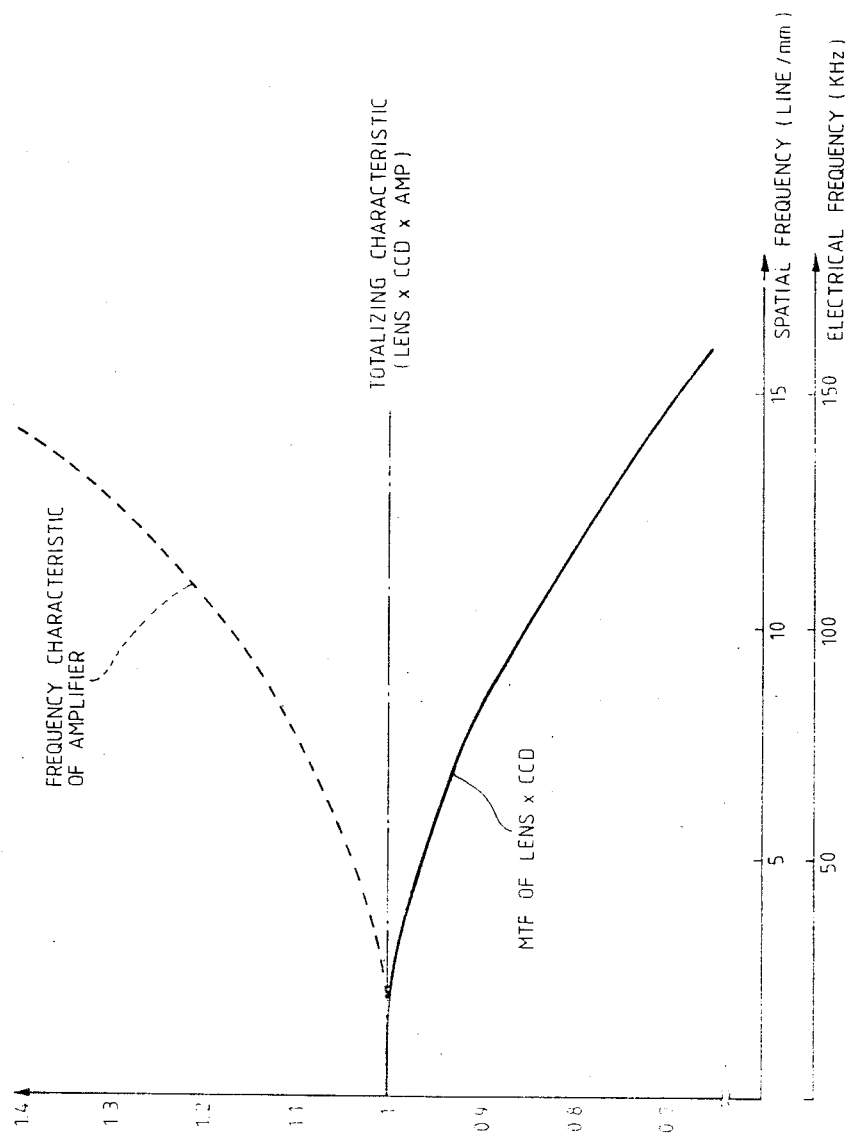
FIG. 14 is a view showing a relationship between optical MTF correction and electrical MTF correction.

The dark-clamped image signal is amplified by amplifiers 100p, 100q, and 100r having frequency characteristics such that their amplification factors are increased when the frequency of the input signal is increased. When the amplifier 100p, 100q, or 100r is constituted by a low-pass active filter, the relationship between the frequency and the amplification factor is as shown in FIG. 12. The relationship is changed when the Q of the filter is changed. By utilizing the ramp characteristics of the amplification factor (increased when a spatial frequency of an image is increased) in the normalized frequency range of 0 to 0.8, the Q of the filter is determined such that the optical MTF of the input means (the lens 15 and the CCD 16) is decreased. An arrangement of the amplifier 100p, 100q, or 100r constituted by the low-pass active filter is shown in FIG. 13. Referring to FIG. 13, the low-pass active filter comprises a fixed resistor R, a capacitor C, an amplifier DA, and a variable resistor VR for adjusting the Q of the filter. FIG. 14 shows a case wherein a decrease in optical MTF of the input means (the lens 15 and the CCD 16) is electrically corrected. More specifically, the decrease in MTF of the lens and the CCD can be compensated by increasing the amplification factor.

An image signal whose MTF is compensated by the amplifiers is A/D-converted by A/D converters 100s, 100t, and 100u. The resultant digital signals are set in latches 100v, 100w, and 100x, respectively. In response to a signal from the timing control 100a, the signals latched by the latches 100v, 100w, and 100x are output to the input image processing unit 101 as multilevel signals (8 bits for each color) representing densities in units of pixels.

The input image processing unit 101 performs necessary correction operations of the MTF-corrected multilevel digital image signal. The necessary correction operations include shading correction, color correction, and gamma-correction.

The multilevel composition unit 106 in the control 2 selects the digital image signal sent from the scanner section 1 or the digital image signal sent through the parallel I/F, or produces a composite signal of these signals. The selected or composite image data as the multilevel digital image signal is sent to the image processing unit 107.

The image processing unit 107 performs smoothing, edge emphasis, black extraction, and masking for color correction of recording inks used in the recording heads 117 to 120. A multilevel digital image signal output is input to the binary coding processing unit 108 and the buffer memory 110.

The binary coding processing unit 108 performs binary coding of the multilevel digital image signal and can select simple binary coding using a fixed slice level, pseudo halftone processing using a dither method, or the like. The multilevel digital image signal is converted into binary parallel image signals of four colors. The 4-color image data is input to the binary composition unit 109, and the 3-color image data is input to the buffer memory 110.

The binary composition unit 109 selects the 3-color binary parallel image signal sent from the buffer memory 110 or the 4-color binary parallel image signal sent from the binary coding processing unit 108 or generates a 4-color composite parallel image signal of these signals.

The buffer memory 110 stores and outputs multilevel and binary images through a parallel I/F and has a memory capacity for three color components.

The synchronization delay memory 115 in the printer section 3 absorbs variations in operation times of the mechanism of the printer section 3, and corrects the delay due to different positions of the recording heads 117 to 120. The synchronization delay memory 115 generates timing signals for the recording heads 117 to 120.

A head driver 116 is an analog driver for driving the recording heads 117 to 120 and generates drive signals for directly driving the recording heads 117 to 120.

The recording heads 117 to 120 inject cyan, magenta, yellow, and black inks, respectively, to record a full-color image on the recording sheet.

Figure 9:
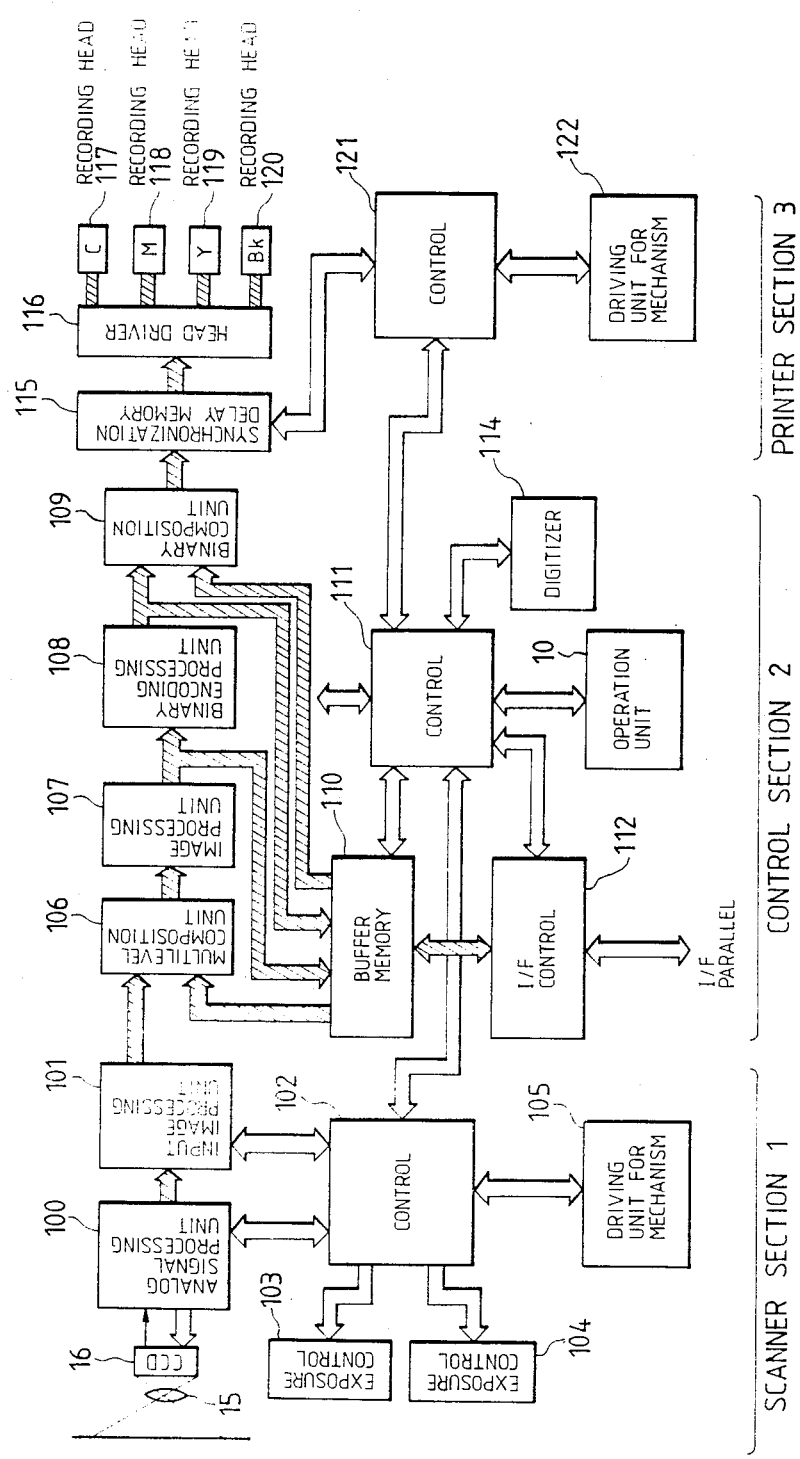
FIG. 9 is a block diagram of the digital color copying machine shown in FIG. 1.
Figure 10:
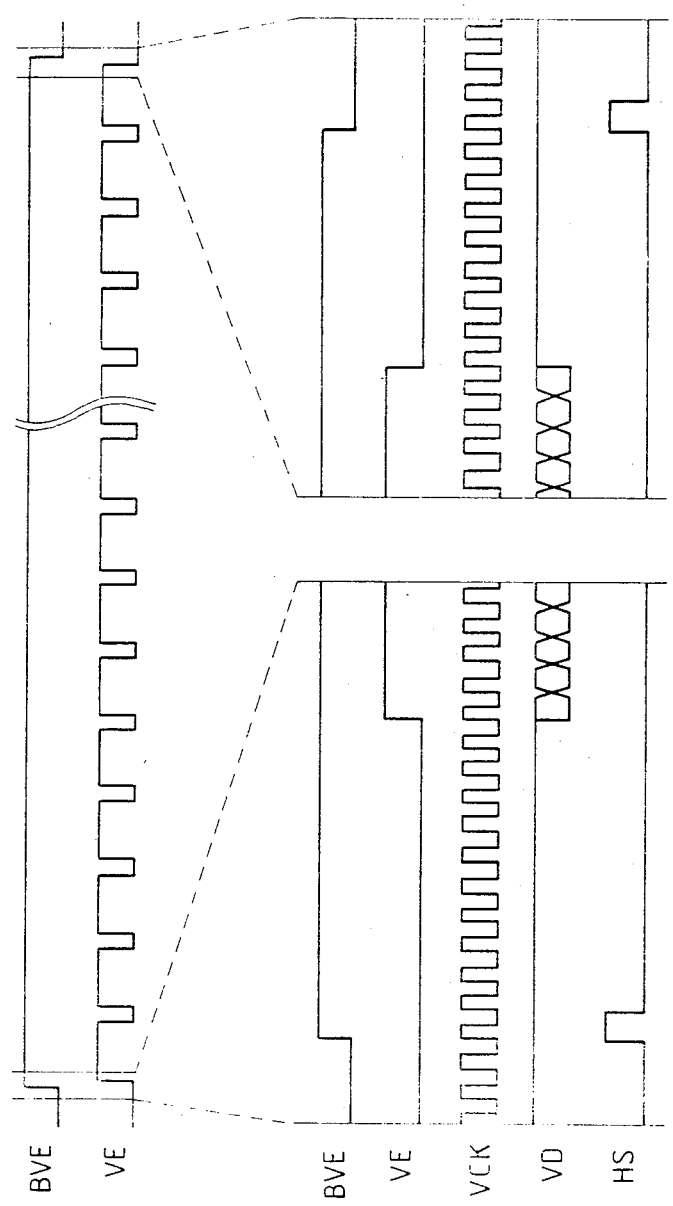
FIG. 10 is a timing chart for explaining an operation of the circuit shown in FIG. 9.

FIG. 10 is a timing chart for explaining the operations of the circuit blocks in FIG. 9.

A signal BVE is a signal representing a valid image interval in each scanning cycle of main scanning described with reference to FIG. 5. The signal BVE is output a plurality of times to output the entire image.

A signal VE is a signal representing a valid interval of a one-line image read by the CCD 16. The signal VE is valid only when the signal BVE is valid.

A signal VCK is a clock signal for sending image data VD. The signals BVE and VE are changed in synchronism with the signal VCK.

A signal HS is a signal used to repeat valid and invalid intervals in a discrete manner during a one-line output of the signal VE. When the one-line output of the signal VE is continuously valid, the signal HS need not be used. Therefore, the signal HS serves as a signal representing the start of one-line image output.

As described above, by changing the amplification factor for the serial image signal in accordance with the spatial frequency of the input signal, the decrease in optical MTF which is caused by the shapes of openings of the lens and the image sensor can be electrically corrected, and the original image can be accurately read.

Figure 15:
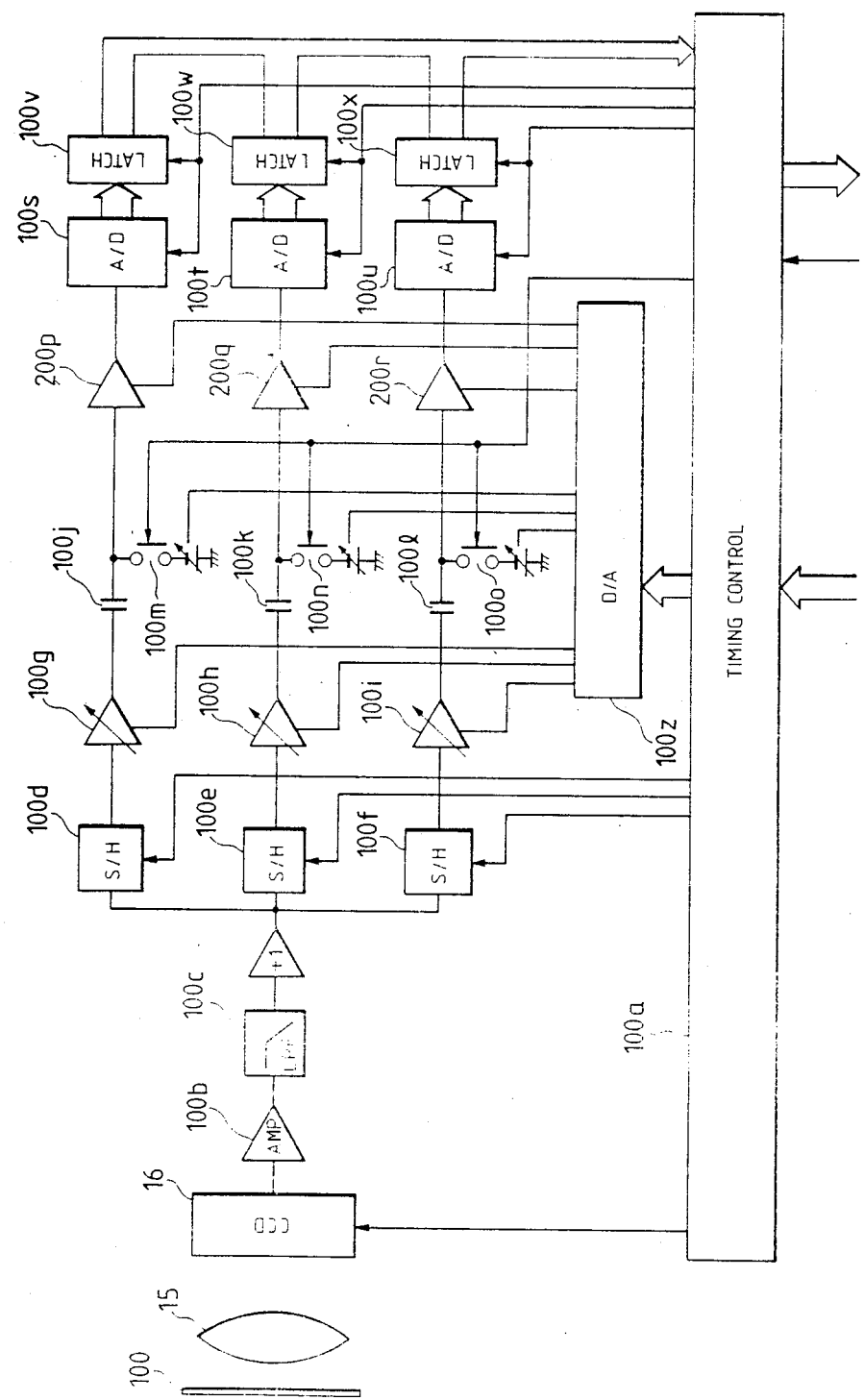
FIG. 15 is a block diagram showing another arrangement of an analog signal processing unit.

FIG. 15 shows another arrangement of the analog signal processing unit 100.

The same reference numerals as in FIG. 11 denote the same parts in FIG. 15.

Referring to FIG. 15, an image of an original 100 is focused on a CCD 16 by a lens 15. The CCD 16 photoelectrically converts the focused image into a serial analog electrical signal in an order of red, green, and blue. This electrical signal is amplified by an amplifier 100b, and the amplified signal is input to a low-pass filter 100c to eliminate a noise component of the image signal. The resultant image signal is separated into red (R), green (G), and blue (B) color image signals by S/H circuits 100d, 100e, and 100f in accordance with a signal from a timing control 100a. Variable amplifiers 100g, 100h, and 100i are voltage-controlled amplifiers whose amplification factors are controlled in accordance with an output voltage from a D/A converter 100z. The separated color image signals are amplified by the variable amplifiers 100g, 100h, and 100i in accordance with the signal from the timing control 100a such that the amplification factors are controlled so as to obtain the identical amplitudes of the color signals when a white board is read.

Capacitors 100j, 100k, and 100l and switches 100m, 100n, and 100o perform dark clamping of the image signals in accordance with the signal from the timing control 100a. The dark clamping level is set through the D/A converter 100z in accordance with the signal from the timing control 100a.

Figure 16:
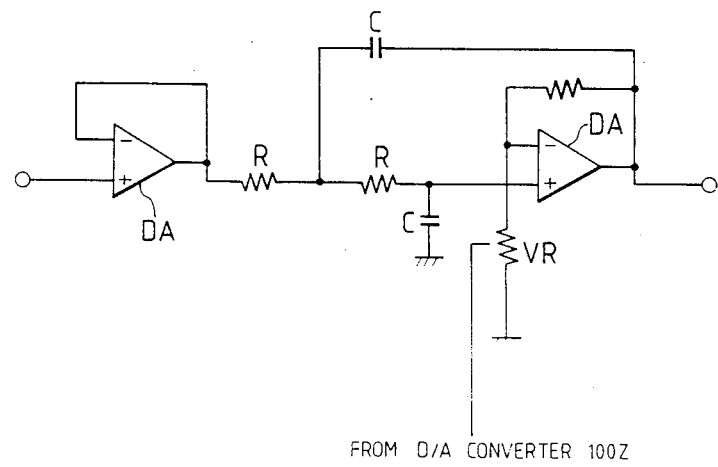
FIG. 16 is a block diagram showing another arrangement of an amplifier having a variable frequency characteristic.

The dark-clamped image signal is amplified by amplifiers 200p, 200q, and 200r having frequency characteristics such that amplification factors are increased when the frequency of the input signal is increased. An arrangement of the amplifier 200p, 200q, or 200r constituted by a low-pass active filter is as shown in FIG. 16. Referring to FIG. 16, the low-pass active filter comprises a fixed resistor R, a capacitor C, an amplifier DA, and a variable filter VR for Q. In the low-pass active filter in FIG. 16, the resistance of the variable resistor VR is changed in accordance with a voltage from the D/A converter 100z, so that the frequency characteristics of the low-pass filter are changed, as shown in FIG. 12. By using the ramp characteristics of the amplification factors in the normalized frequency range of 0 to 0.8 in FIG. 12, the Q of the filter is determined such that the decrease in optical MTF in the input means (the lens 15 and the CCD 16) is corrected. The Q of this filter can be changed in units of color components through the D/A converter 100z in accordance with the signal from the timing control 100a. In this manner, the decrease in optical MTF in the input means (the lens 15 and the CCD 16) can be corrected by the amplifiers 200p, 200q, and 200r, as shown in FIG. 14. The MTF-corrected image signals are converted by A/D converters 100s, 100t, and 100u into digital signals. These digital signals are latched by latches 100v, 100w, and 100x, respectively. The signals latched in the latches 100v, 100w, and 100x are output to an input image processing unit 101 as multilevel signals (8 bits in each color) representing the densities in units of pixels in accordance with the signal from the timing control 100a.

Since the decrease in MTF of each color can be corrected by the frequency variable amplifiers 200p, 200q, and 200r, the perfect color balance of an image having a high spatial frequency can be achieved. For example, by using a gray chart of 5 lines/mm as an original 100, the frequency characteristics of the amplifier 200p which has a red image signal (output from the latch 100v) equal to an output corresponding to a maximum TFT will be obtained by changing the Q value in accordance with the signal from the D/A converter 100z. Similarly, the frequency characteristics of the amplifier 200p has a red image signal output (output from the latch 100v) equal to an output corresponding to the maximum MTF are obtained using gray charts of 6 lines/mm to 15 lines/mm. The Q value of the amplifier 200p is determined such that the total characteristics whose decrease in MTF of the lens 15 and the CCD 16 is corrected is almost flat. Therefore, the final red frequency characteristics of the amplifier 200p are obtained.

Similarly, the Q values of the amplifiers 200q and 200r are determined such that the corrected characteristics of the green and blue image signals (outputs from the latches 100w and 100x) are almost flat.

As is apparent from the above description, the frequency characteristics of the color amplifiers 200p, 200q, and 200r are obtained such that the MTF values in the entire range of a lower spatial frequency to a higher spatial frequency are made flat. Therefore, a perfect color balance can be obtained in the entire range of spatial frequencies of color originals.

As has been described above, the amplification factors of the serial image signals are changed in accordance with the spatial frequencies of the input signals, and the decrease in optical MTF which is caused by the shapes of openings of the lens and the image sensor can be electrically corrected. Therefore, a color original image can be accurately read.

Since the decrease in optical MTF can be corrected by the frequency variable amplifiers in units of colors, a perfect color balance can be obtained at a portion of a color original having a high spatial frequency.

In the above embodiment, the CCD having several hundreds of pixels is used to read a plurality of areas of a large original. The present invention is not limited to this. A CCD of several thousands of pixels may be used to read from one end to the other of the original in one scanning cycle.

The characteristics of the amplifiers whose amplification factors are changed in accordance with the spatial frequencies of the image are set in consideration of the type of an image to be read, characteristics of the read sensor, and the read resolution.

The present invention is exemplified by the preferred embodiment. However, the present invention is not limited to this. Various changes and modifications may be made within the spirit and scope of the invention defined in the appended claims.

What is claimed is:

1. An image reading apparatus comprising:
   reading means for photoelectrically reading an original image and outputting an image signal representing the original image; and
   amplifying means for amplifying the image signal output from said reading means, said amplifying means being arranged such that an amplification factor thereof varies in response to a spatial frequency of an image represented by the input signal to be amplified, the amplification factor increasing as the spatial frequency increases, and the amplification factor decreasing as the spatial frequency decreases.

2. An apparatus according to claim 1, wherein said reading means reads the original image in units of lines and outputs a serial image signal.

3. An apparatus according to claim 1, wherein the amplification factor of said amplifying means varies at a rate which is variable.

4. An apparatus according to claim 1, further comprising converting means for converting the image signal amplified by said amplifying means into a digital image signal.

5. An image reading apparatus comprising:
   reading means for photoelectrically reading a color original image by color separation, and outputting a plurality of color component signals representing color components of the color original image; and
   a plurality of amplifying means each for amplifying an associated one of the plurality of color component signals from said reading means, said plurality of amplifying means being such that amplification factors thereof each vary in response to a spatial frequency of an image represented by the associated one of the plurality of color component signals to be amplified, the amplification factor increasing as the spatial frequency increases, and the amplification factor decreasing as the spatial frequency decreases.

6. An apparatus according to claim 5, wherein said reading means reads the color original image in units of lines and serially outputs the color component signals.

7. An apparatus according to claim 5, wherein the amplification factors of said plurality of amplifying means vary at rates which are different from each other.

8. An apparatus according to claim 5, wherein the amplification factor vary at rates which are variable.

9. An apparatus according to claim 5, further comprising means for separating the plurality of color component signals output from said reading means on an individual color component basis.

10. An apparatus according to claim 4, further comprising a plurality of converting means each for converting the associated one of the plurality of color component signals amplified by said plurality of amplifying means into a digital color component signal.

11. An image reading apparatus comprising:
reading means for photoelectrically reading a color original image by color separation, and outputting a plurality of color component signals representing color component of the color original image; and
a plurality of amplifying means each for amplifying an associated one of the plurality of color components signals from said reading means, said plurality of amplifying means being arranged such that amplification factors thereof each vary in response to a spatial frequency of an image represented by the associated one of the plurality of color component signals to be amplified, and the amplification factors vary at rates which are different from each other.

12. An apparatus according to claim 11, wherein said reading means reads the color original image in units of lines and serially outputs the color component signals.

13. An apparatus according to claim 11, wherein the amplification factors vary at rates which are variable.

14. An apparatus according to claim 11, further comprising means for separating the plurality of color component signals output from said reading means on an individual color component basis.

15. An apparatus according to claim 11, further comprising a plurality of converting means each for converting the associated one of the plurality of color component signals amplified by said plurality of amplifying means into a digital color component signal.

16. An apparatus according to claim 11, wherein, as the spatial frequency increases the amplification factor increases, and as the spatial frequency decreases the amplification factor decreases.

* * * * *